US 6,685,610 B2

(12) United States Patent
Holopainen

(10) Patent No.: US 6,685,610 B2
(45) Date of Patent: Feb. 3, 2004

(54) DEFLECTION COMPENSATED ROLL FOR PAPER/BOARD OR FINISHING MACHINE

(75) Inventor: Kari Holopainen, Muurame (FI)

(73) Assignee: Metso Paper, Inc., Helsinki (FI)

( * ) Notice: Subject to any disclaimer, the term of this patent is extended or adjusted under 35 U.S.C. 154(b) by 152 days.

(21) Appl. No.: 09/849,149

(22) Filed: May 4, 2001

(65) Prior Publication Data

US 2002/0004440 A1 Jan. 10, 2002

(30) Foreign Application Priority Data

May 10, 2000 (FI) .................................. 2001099

(51) Int. Cl.$^7$ .................................. D21F 7/02
(52) U.S. Cl. ................. 492/16; 492/7; 492/20
(58) Field of Search ................. 492/7, 16, 20, 492/2; 162/358.3; 384/116, 117, 100; 100/47, 168–170, 162 B, 162 R; 72/245

(56) References Cited

U.S. PATENT DOCUMENTS

| 4,319,389 A | | 3/1982 | Marchioro | 29/116 AD |
|---|---|---|---|---|
| 5,076,891 A | | 12/1991 | Link et al. | 162/206 |
| 5,534,117 A | | 7/1996 | Roerig | 162/358.3 |
| 5,620,566 A | * | 4/1997 | Holopainen | 162/205 |
| 5,695,612 A | * | 12/1997 | Holopainen | 162/205 |
| 5,897,476 A | * | 4/1999 | Ehrola et al. | 492/7 |
| 5,909,917 A | | 6/1999 | Kivioja et al. | 28/895.2 |
| 6,012,386 A | * | 1/2000 | Lahtinen et al. | 100/47 |
| 6,129,453 A | * | 10/2000 | Holopainen et al. | 384/116 |
| 6,346,066 B1 | * | 2/2002 | Kivioja | 492/7 |
| 6,409,644 B1 | * | 6/2002 | Van Haag | 492/7 |
| 6,488,815 B2 | * | 12/2002 | Holopainen | 162/272 |
| 6,497,177 B2 | * | 12/2002 | Brendel et al. | 100/35 |
| 6,500,304 B1 | * | 12/2002 | Holopainen et al. | 162/205 |

FOREIGN PATENT DOCUMENTS

GB 1457314 4/1974

* cited by examiner

*Primary Examiner*—I Cuda Rosenbaum
(74) *Attorney, Agent, or Firm*—Steinberg & Raskin, P.C.

(57) ABSTRACT

A deflection compensated roll for a paper/board or finishing machine includes a stationary roll shaft (1), and a roll shell (2) structured and arranged to be rotatable around the same and mounted with slide bearing elements (3–6) upon the roll shaft (2). The slide bearing elements are provided with hydraulic fluid feeding means for loading the slide bearing elements with a hydraulic fluid. The roll is intended to form a nip together with a counter roll. The hydraulic fluid feeding device is provided with control elements, whereby the slide bearing elements (3, 4) acting in the direction of a nip load (F) are loadable in such a way that the roll shell (2) is able to perform a stroke relative to the roll shaft (1) radially of the roll or to remain substantially immobilized relative to the roll shaft (1).

8 Claims, 4 Drawing Sheets

US 6,685,610 B2

DEFLECTION COMPENSATED ROLL FOR PAPER/BOARD OR FINISHING MACHINE

FIELD OF THE INVENTION

The present invention relates to a deflection compensated roll for a paper/board or finishing machine, comprising a stationary roll shaft, and a, roll shell adapted to be rotatable around the same and mounted with slide bearing elements upon the roll shaft, said slide bearing elements being provided with hydraulic fluid feeding means for loading the slide bearing elements with a hydraulic fluid, and said roll being intended to form a nip together with a counter roll.

BACKGROUND OF THE INVENTION

FI patent 98320 describes a slide bearing assembly for a deflection compensated roll, wherein the roll shell is able to shift or perform a stroke relative to the roll shaft both in a main loading plane and in a lateral bearing plane perpendicular thereto. One implementation of such a "movable shell" roll will be described more closely hereinafter in reference to FIGS. 1–3. On the other hand, Finnish patent application No. 990329 discloses a solution for fitting a roll with slide bearings in such a way that the shell is not able to move relative to the shaft, the roll shell bearing assembly allowing substantially no stroke. This type of solution will be described more closely hereinafter in reference to FIG. 4.

FIGS. 1 and 2 show in schematic elevations a prior art tubular roll with slide bearings, such that FIG. 1 is an axial elevation of the roll and FIG. 2 is a sectional view taken along a line II—II of the roll depicted in FIG. 1. In FIGS. 1 and 2 the deflection compensated roll is generally designated with reference numeral 110 and it comprises a stationary roll shaft 111, upon which is rotatably fitted a roll shell 112 which is supported on the roll shaft by means of hydraulic loading elements 117. The hydraulic loading elements 117 work in the direction of a nip plane and enable an adjustment of the roll shell 112 regarding its contour and a control of the roll regarding its axial nip profile.

The roll 110 has its bearing system implemented by means of slide bearing elements, whereof the slide bearing elements, acting in the direction of loading, in the case of a roll shown in FIGS. 1 and 2 in the direction of a nip plane, are designated with reference numerals 114 and 114a. The first slide bearing elements 114 work in the direction of a nip, i.e. against loading, and the second slide bearing elements 114a work in the opposite direction. The exemplary embodiment of FIGS. 1 and 2 further shows that the roll 110 is also provided with slide bearing elements 115, 115a working laterally relative to the loading direction and acting in opposite directions. The roll 110 is a roll totally furnished with slide bearings, which is also provided with slide bearing elements 116, 116a acting in directions axially opposite to each other and abutting against roll ends 113, 113a through the intermediary of an oil film. As shown in FIGS. 1 and 2, the radially acting slide bearing elements 114, 115, 114a, 115a abut against the inner surface of the roll shell 112 through the intermediary of an oil film. In the representation of FIG. 1, the radially acting slide bearing elements 114, 114a, 115, 115a are arranged in pairs, such that there are two specimens of each slide bearing element set side by side in axial direction. From the functional point of view, however, such an arrangement is not an absolute necessity as the bearing system can also be implemented by using just single slide bearing elements.

On the other hand, FIG. 2 suggests that the slide bearing elements 114, 114a, 115, 115a be adapted to act in the direction of loading and in the direction lateral thereto. However, there could be additional slide bearing elements adapted to work radially in various angular positions.

FIG. 3 shows schematically and in partial section one prior art arrangement for supporting a slide-bearing mounted roll and for fitting the same with bearings in a loading direction, i.e. in the direction of a nip plane regarding the roll 110 depicted in FIG. 1. In FIG. 3, the roll shaft is also designated with reference numeral 111 and the roll shell with reference numeral 112. The following description deals first with the support system of FIG. 3 in terms of its construction and then with the support system in terms of its function.

The roll shell 112 is supported against an inner surface 112' of the roll shell by means of loaded slide bearing elements 114, 114a which, as shown in FIG. 3, work actively in opposite directions, such that the first slide bearing element 114 loads the roll shell 112 toward an external load applied to the roll shell, i.e. toward a nip, and the second slide bearing element 114a in the opposite direction, respectively. In the construction of FIG. 3, the slide bearing elements 114, 114a are provided with pressurizable cavities 61, 61a, and for each slide bearing element 114, 114a the roll shaft 111 is fitted with body blocks 63, 63a which penetrate into said cavities 61, 61a of the slide bearing elements, the body blocks 63, 63a being sealed relative thereto by means of packings 63', 63'a so as to allow a movement of the slide bearing elements 114, 114a relative to the body blocks 63, 63a. In structural sense, the slide bearing elements 114, 114a are conventional by having the outer surface thereof provided with oil pockets 64, 64a which are in communication with the cavities 61, 61a by way of capillary borings 65, 65a extending through the slide bearing elements. Thus, the pressurized cavities 61, 61a release through the capillary borings 65, 65a a pressure fluid, particularly oil, into the oil pockets 64, 64a for establishing an oil film between the slide bearing elements 114, 114a and the inner surface 112' of the roll shell.

In the representation of FIG. 3, the first slide bearing element 114 acting in the loading direction is provided with an adjustment means 66, comprising a bore 76 made in the body block 63 of the slide bearing element and movably fitted with a three-section slide valve 69, 70, 71, including a middle slide-valve section 69, a first end section 70, and a second end section 71. The slide-valve sections 69, 70, 71 are linked by a spindle rod 67, which holds the slide-valve sections apart from each other and which spindle rod 67 abuts against a floor 62 of the cavity in the first slide bearing element 114. The bore 76 has its bottom underneath the second slide-valve end section 71 fitted with a spring 68, which stresses said spindle rod 67 against the cavity floor 62. Hence, the adjustment means 66 is constituted by a valve, which is supplied with a pressure fluid through a central passage 120a and a supply passage 119a and which distributes the pressure and flow rate of the supplied pressure fluid at a desired and predetermined ratio through flow paths 72 and 73 defined by the slide-valve sections 69, 70, 71 of the adjustment means 66, as well as through a connecting channel 118a and pressure passages 75, 75a made in the body blocks 63, 63a of the slide bearing elements 114, 114a into the cavities 61, 61a of the slide bearing elements. The bore 76 is further provided with an annular groove 74 at a confluence between the supply passage 119a and the bore 76.

The roll shell 112 is capable of moving radially relative to the roll shaft 111 also in the direction of loading. In the case of FIG. 3, the roll shell 112 is depicted in a middle position, and from this middle position the roll shell 112 is allowed to travel a certain distance in either direction. For example, when dealing with the deflection compensated roll 110 of FIG. 1, which constitutes a nip with a counter roll, a suitable permissible stroke for the roll shell 112 is for instance 25 mm in either direction. Of course, this distance is only given by way of example. The adjustment means 66 is used to control strokes of the roll shell 112 in the appropriate direction of loading and to limit the stroke to a maximum distance desired therefor. As perceivable from FIG. 3, the middle slide-valve section 69 of the adjustment means 66 has an axial length which exceeds that of the annular groove 74 made in the bore 76, and this dimensioning, explicitly, has a crucial significance in controlling the roll shell 112 as regards its strokes or movements.

In the condition shown in FIG. 3, wherein the roll shell 112 is in its middle position, the middle slide-valve section 69 covers the annular groove 74 completely. When the roll shell 112 commences its stroke from the position of FIG. 3 in either direction, for example downward in FIG. 3, the first slide bearing element 114 loaded through an oil film against the inner roll shell surface 112' accompanies the roll shell 112 in its stroke and uses the spindle rod 67 to press the slide valve of the adjustment means 66 in the same direction against the loading force of the spring 68. The middle slide-valve section 69 has its axial length dimensioned such that, as the roll shell 112 approaches its permissible extreme position, the slide valve 69, 70, 71 has shifted to such a position that pressure fluid is allowed to flow from the supply passage 119a through the annular groove 74 past the middle slide-valve section 69 into the first flow path 72 and thence further along the pressure channel 75 into the cavity 61. This develops a braking pressure for the stroke of the roll shell 112, which ultimately stops the roll shell 112 in its permissible extreme position. This preferably results in a closure of pressure channels used for a regular setting pressure and extending to the slide bearing elements 114, 114a. An advantage offered by this configuration is that it enables controlled strokes for the roll shell 112 without external control and, furthermore, it protects the oil films of the slide bearing elements 114, 114a also in the extreme positions of the roll shell 112. The arrangement has naturally an equivalent operation when the roll shell 112 performs its stroke in the opposite direction.

The representation of FIG. 3 is incomplete in the sense that said figure only discloses the way of controlling and decelerating strokes of the roll shell 112. It is quite obvious, however, that, in addition to pressure connections depicted in FIG. 3, the cavity 61, 61a of each slide bearing element 114, 114a must be supplied, also in the middle position shown in FIG. 3, with a normal setting pressure for loading the slide bearing elements 114, 114a against the inner roll shell surface 112' also in the condition shown in the figure. As perceivable from FIG. 3, the supply of a setting pressure cannot be handled through the supply passage 119a as the annular groove 74 is completely covered by the middle slide-valve section 69 blocking the flow of a pressure fluid to either flow path 72, 73. For the introduction of setting pressures, each body block 63, 63a must simply be provided with an extra channel connected to a pressure source, the pressure fluid supplied thereby not passing through the adjustment means 66.

FIG. 4 illustrates an arrangement according to application 990329 for fitting a roll shell with bearings without stroke. The figure depicts a stationary roll shaft 1, around which is rotatably mounted a roll shell 2, the external load applied thereto being designated with reference symbol F. The bearing assembly acting in a plane of loading comprises a slide bearing element 3 working against the load, as well as a slide bearing element 4 working in the loading direction. These slide bearing elements 3, 4 of the load bearing assembly are controlled by a control valve 7, which is supplied with a hydraulic fluid pressure along a feed line 8, the valve 7 distributing the pressure for a cavity 12 of the slide bearing element 3 and along a line 9 for a cavity 13 of the slide bearing element 4. The cavities 12, 13 have pressure measuring/standby lubricating lines 11 and 10, respectively, connected therewith. The operation of such a non-stroke bearing assembly has been described in more detail in the above-mentioned FI application 990329 and the operation of such a non-stroke bearing assembly is old and well known in the art and no further explanation is needed for the understanding of the non-stroke bearing assembly by a person of ordinary skill in the art. The roll, shell has its lateral bearing system implemented by means of lateral bearing elements 5 and 6 as described for example in FI patent 98320 and the operation of such a lateral bearing system implemented by means of lateral bearing elements is old and well known in the art and no further explanation is needed for the understanding of the non-stroke bearing assembly by a person of ordinary skill in the art.

In certain calendar applications there is a need to run two movable shell rolls oppositely to each other, whereby one of the rolls must be securely immobilized. In this case, the nip forces are created by loading the movable shell roll against a counter roll having its shell immobilized.

OBJECTS AND SUMMARY OF THE INVENTION

It is one object of the present invention to provide a solution, whereby, if necessary, the bearing system of a movable shell roll can be converted into a non-stroke system in a relatively simple fashion, the shell becoming immobilized relative to the roll shaft in the loading direction.

In order to accomplish this object, a roll of the invention is characterized in that the hydraulic fluid feeding means are provided with control elements, whereby the slide bearing elements acting in the direction of a nip load are loadable in such a way that the roll shell is optionally able to perform a stroke relative to the roll shaft radially of the roll or to remain substantially immobilized relative to the roll shaft.

BRIEF DESCRIPTION OF THE DRAWINGS

The invention will now be described in more detail with reference to the accompanying drawings, in which.

DETAILED DESCRIPTION OF THE INVENTION

Figure 1:
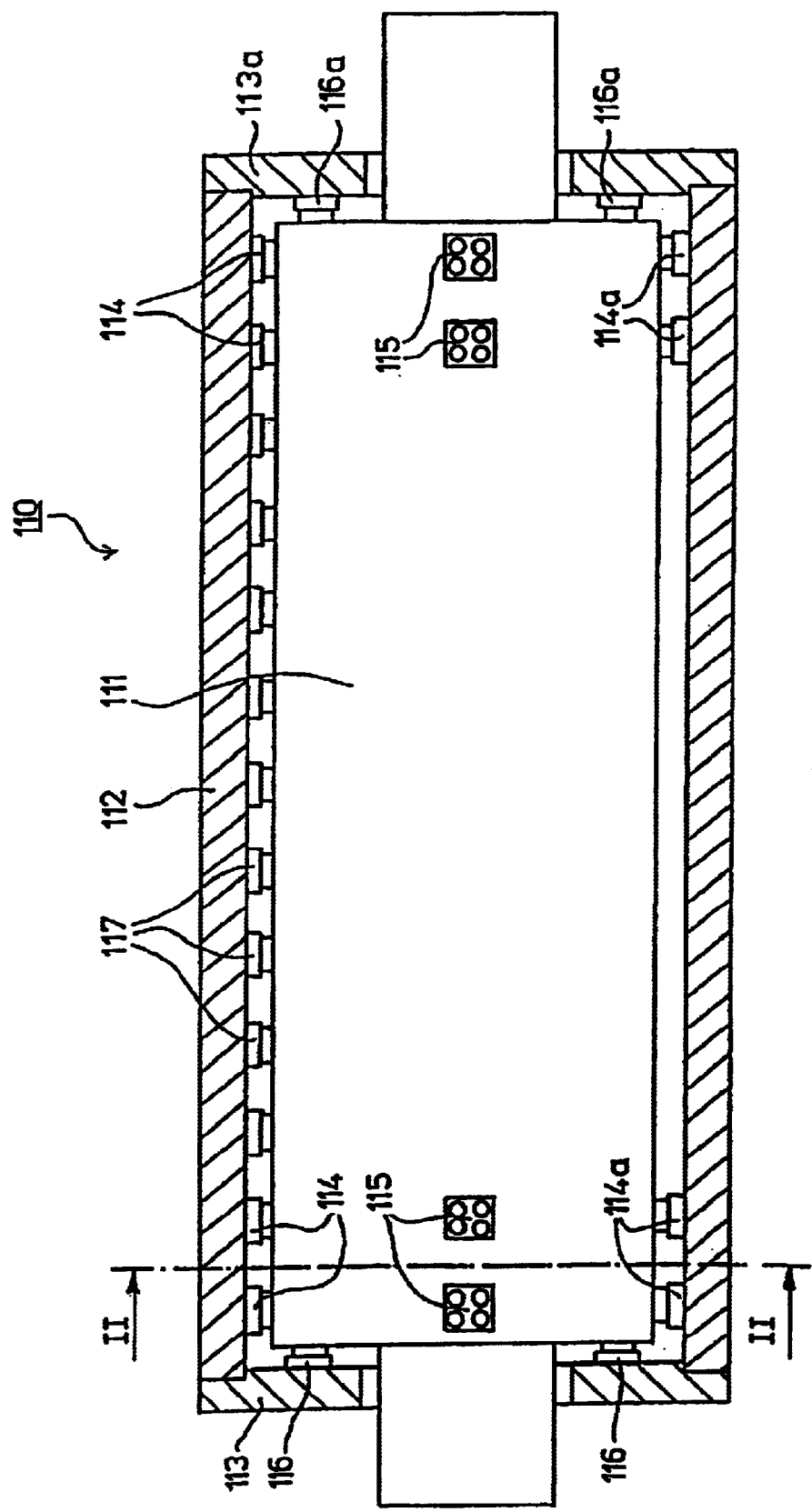
FIGS. 1 and 2 show in schematic elevations one tubular roll of the prior art fitted with slide bearings.
Figure 2:
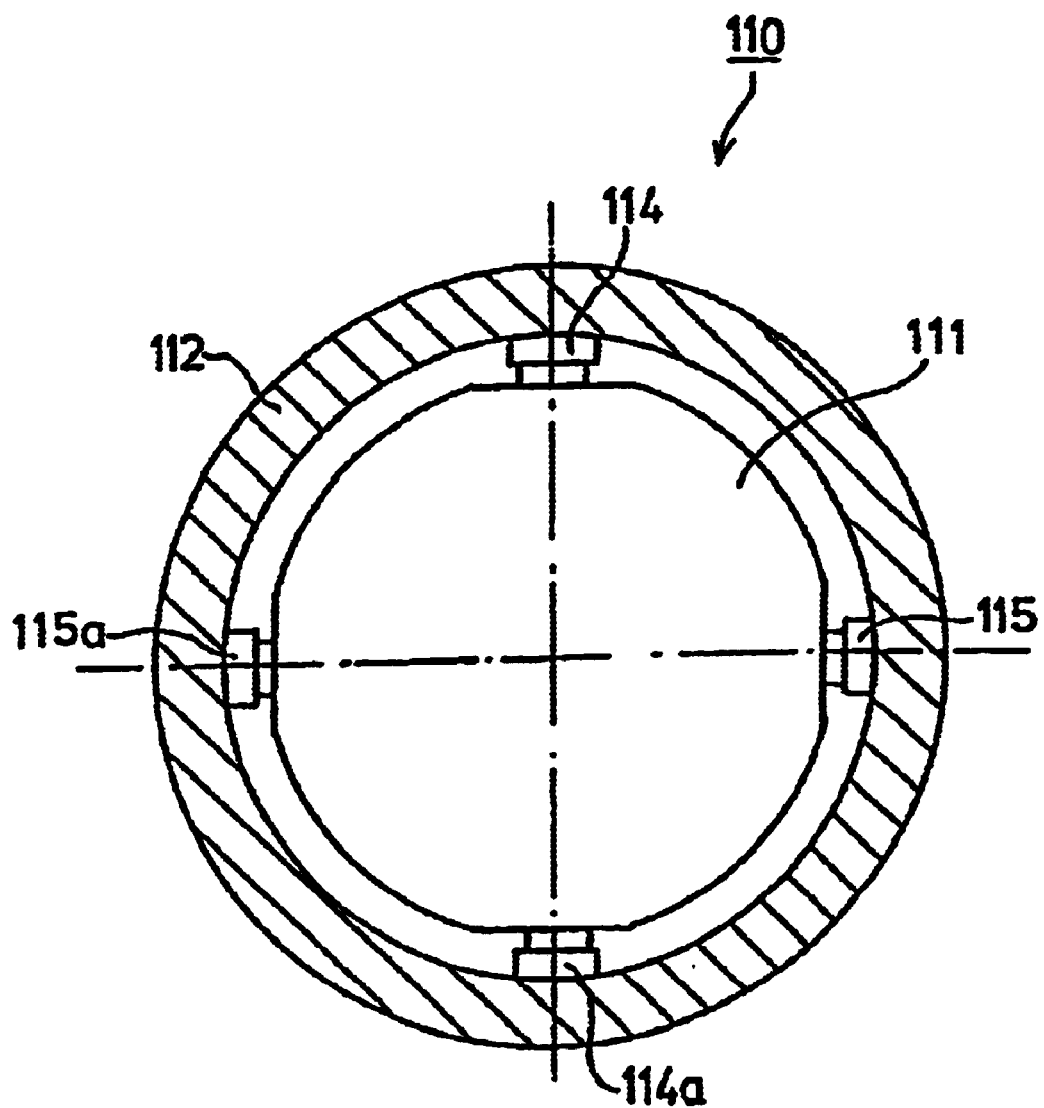

FIGS. 1 and 2 show in schematic elevations a prior art tubular roll with slide bearings, such that FIG. 1 is an axial elevation of the roll and FIG. 2 is a sectional view taken along a line II—II of the roll depicted in FIG. 1. In FIGS. 1 and 2 the deflection compensated roll is generally designated with reference numeral 110 and it comprises a stationary roll shaft 111, upon which is rotatably fitted a roll shell 112 which is supported on the roll shaft by means of hydraulic loading elements 117. The hydraulic loading elements 117 work in the direction of a nip plane and enable an adjustment of the roll shell 112 regarding its contour and a control of the roll regarding its axial nip profile.

The roll 110 has its bearing system implemented by means of slide bearing elements, whereof the slide bearing elements, acting in the direction of loading, in the case of a roll shown in FIGS. 1 and 2 in the direction of a nip plane, are designated with reference numerals 114 and 114a. The first slide bearing elements 114 work in the direction of a nip, i.e. against loading, and the second slide bearing elements 114a work in the opposite direction. The exemplary embodiment of FIGS. 1 and 2 further shows that the roll 110 is also provided with slide bearing elements 115, 115a working laterally relative to the loading direction and acting in opposite directions. The roll 110 is a roll totally furnished with slide bearings, which is also provided with slide bearing elements 116, 116a acting in directions axially opposite to each other and abutting against roll ends 113, 113a through the intermediary of an oil film. As shown in FIGS. 1 and 2, the radially acting slide bearing elements 114, 115, 114a, 115a abut against the inner surface of the roll shell 112 through the intermediary of an oil film. In the representation of FIG. 1, the radially acting slide bearing elements 114, 114a, 115, 115a are arranged in pairs, such that there are two specimens of each slide bearing element set side by side in axial direction. From the functional point of view, however, such an arrangement is not an absolute necessity as the bearing system can also be implemented by using just single slide bearing elements.

On the other hand, FIG. 2 suggests that the slide bearing elements 114, 114a, 115, 115a be adapted to act in the direction of loading and in the direction lateral thereto. However, there could be additional slide bearing elements adapted to work radially in various angular positions.

Figure 3:
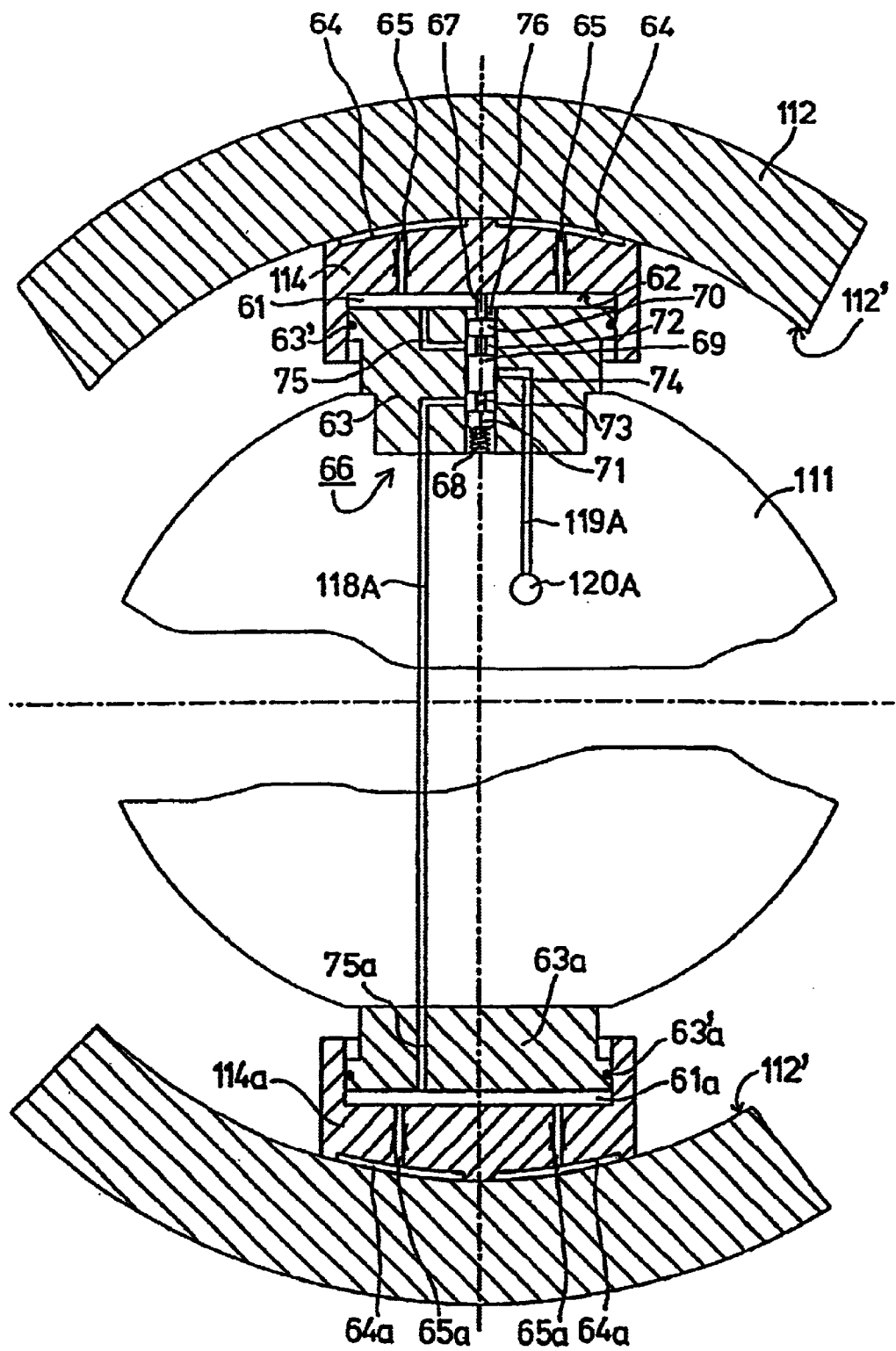
FIG. 3 shows in a schematic view one arrangement of the prior art for supporting a roll shell in a loading direction, said arrangement allowing the roll shell to perform a stroke relative to the roll shaft.

FIG. 3 shows schematically and in partial section one prior art arrangement for supporting a slide-bearing mounted roll and for fitting the same with bearings in a loading direction, i.e. in the direction of a nip plane regarding the roll 110 depicted in FIG. 1. In FIG. 3, the roll shaft is also designated with reference numeral 111 and the roll shell with reference numeral 112. The following description deals first with the support system of FIG. 3 in terms of its construction and then with the support system in terms of its function.

The roll shell 112 is supported against an inner surface 112' of the roll shell by means of loaded slide bearing elements 114, 114a which, as shown in FIG. 3, work actively in opposite directions, such that the first side bearing element 114 loads the roll shell 112 toward an external load applied to the roll shell, i.e. toward a nip, and the second slide bearing element 114a in the opposite direction, respectively. In the construction of FIG. 3, the slide bearing elements 114, 114a are provided with pressurizable cavities 61, 61a, and for each slide bearing element 114, 114a the roll shaft 111 is fitted with body blocks 63, 63a which penetrate into said cavities 61, 61a of the slide bearing elements, the body blocks 63, 63a being sealed relative thereto by means of packings 63', 63'a so as to allow a movement of the slide bearing elements 114, 114a relative to the body blocks 63, 63a. In structural sense, the slide bearing elements 114, 114a are conventional by having the outer surface thereof provided with oil pockets 64, 64a which are in communication with the cavities 61, 61a by way of capillary borings 65, 65a extending through the slide bearing elements. Thus, the pressurized cavities 61, 61a release through the capillary borings 65, 65a pressure fluid, particularly oil, into the oil pockets 64, 64a for establishing an oil film between the slide bearing elements 114, 114a and the inner surface 112' of the roll shell.

In the representation of FIG. 3, the first slide bearing element 114 acting in the loading directions is provided with an adjustment means 66, comprising a bore 76 made in the body block 63 of the slide bearing element and movably fitted with a three-section slide valve 69, 70, 71, including a middle slide-valve section 69, a first end section 70, and a second end section 71. The slide-valve sections 69, 70, 71 are linked by a spindle rod 67, which holds the slide-valve sections apart from each other and which spindle rod 67 abuts against a floor 62 of the cavity in the first slide bearing element 14. The bore 76 has its bottom underneath the second slide-valve end section 71 fitted with a spring 68, which stresses said spindle rod 67 against the cavity floor 62. Hence, the adjustment means 66 is constituted by a valve, which is supplied with a pressure fluid through a central passage 120a and a supply passage 119a and which distributes the pressure and flow rate of the supplied pressure fluid at a desired and predetermined ratio through flow paths 72 and 73 defined by the slide-valve sections 69, 70, 71 of the adjustment means 66, as well as through a connecting channel 118a and pressure passages 75, 75a made in the body blocks 63, 63a of the slide bearing elements 114, 114a into the cavities 61, 61a of the slide bearing elements. The bore 76 is further provided with an annular groove 74 at a confluence between the supply passage 119a and the bore 76.

The roll shell 112 is capable of moving radially relative to the roll shaft 111 also in the direction of loading. In the case of FIG. 3, the roll shell 112 is depicted in a middle position, and from this middle position the roll shell 112 is allowed to travel a certain distance in either direction. For example, when dealing with the deflection compensated roll 110 of FIG. 1, which constitutes a nip with a counter roll, a suitable permissible stroke for the roll shell 112 is for instance 25 mm in either direction. Of course, this distance is only given by way of example. The adjustment means 66 is used to control strokes of the roll shell 112 in the appropriate direction of loading and to limit the stroke to a maximum distance desired therefor. As perceivable from FIG. 3, the middle slide-valve section 69 of the adjustment means 66 has an axial length which exceeds that of the annular groove 74 made in the bore 76, and this dimensioning, explicitly, has a crucial significance in controlling the roll shell 112 as regards its strokes or movements.

In the condition shown in FIG. 3, wherein the roll 112 is in its middle position, the middle slide-valve section 69 covers the annular groove 74 completely. When the roll shell 112 commences its stroke from the position of FIG. 3 in either direction, for example downward in FIG. 3, the first slide bearing element 114 loaded through an oil film against the inner roll shell surface 112' accompanies the roll shell 112 in its stroke and uses the spindle rod 67 to press the slide valve of the adjustment means 66 in the same direction against the loading force of the spring 68. The middle slide-valve section 69 has its axial length dimensioned such that, as the roll shell 112 approaches its permissible extreme position, the slide valve 69, 70, 71 has shifted to such a position that pressure fluid is allowed to flow from the supply passage 119a through the annular groove 74 past the middle slide-valve section 69 into the first flow path 72 and thence further along the pressure channel 75 into the cavity 61. This develops a braking pressure for the stroke of the roll shell 112, which ultimately stops the roll shell 112 in its permissible extreme position. This preferably results in a closure of pressure channels used for a regular setting pressure and extending to the slide bearing elements 114, 114a. An advantage offered by this configuration is that it enables controlled strokes for the roll shell 112 without external control and, furthermore, it protects the oil films of the slide bearing elements 114, 114a also in the extreme positions of the roll shell 112. The arrangement has naturally an equivalent operation when the roll shell 112 performs its strokes in the opposite direction.

The representation of FIG. 3 is incomplete in the sense that said figure only discloses the way of controlling and decelerating strokes of the roll shell 112. It is quite obvious, however, that, in addition to pressure connections depicted in FIG. 3, the cavity 61, 61a of each slide bearing element 114, 114a must be supplied, also in the middle position shown in FIG. 3, with a normal setting pressure for loading the slide bearing elements 114, 114a against the inner roll shell surface 112' also in the condition shown in the figure. As perceivable from FIG. 3, the supply of a setting pressure cannot be handled through the supply passage 119a as the annular groove 74 is completely covered by the middle slide-valve section 69 blocking the flow of pressure fluid to either flow path 72, 73. For the introduction of setting pressures, each body block 63, 63a must simply be provided with an extra channel connected to a pressure source, the pressure fluid supplied thereby not passing through the adjustment means 66.

Figure 4:
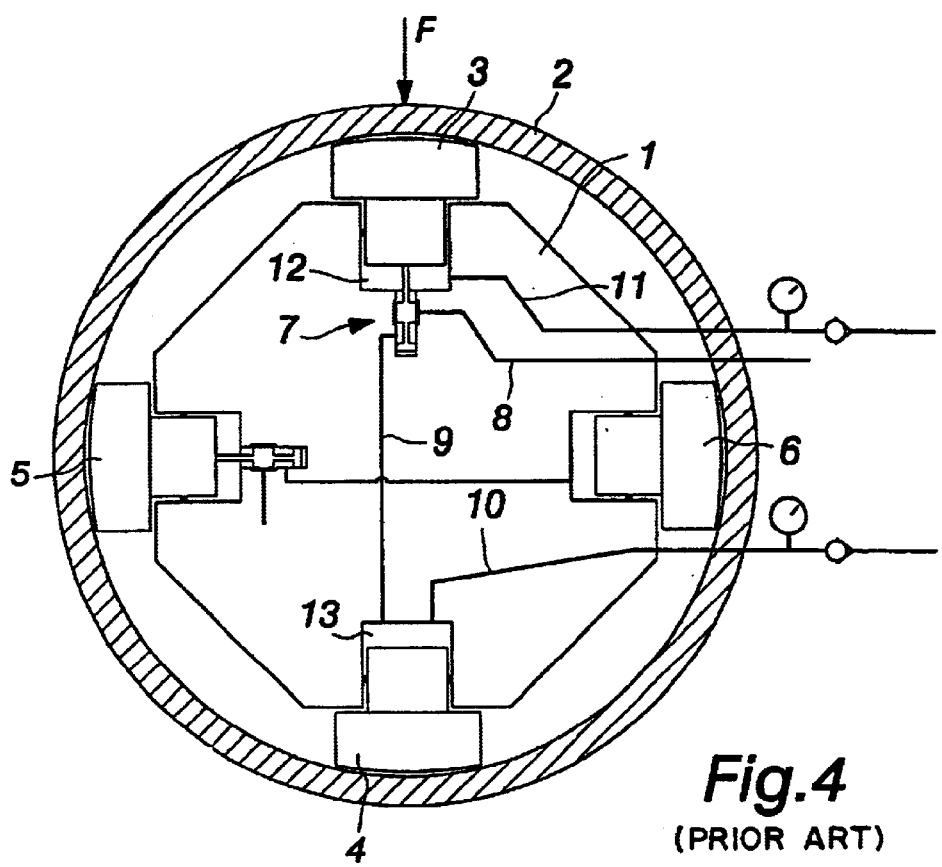
FIG. 4 shows in a schematic view another arrangement of the prior art for supporting a roll shell in a loading direction, which maintains the roll shell immobilized relative to the roll shaft.

FIG. 4 illustrates an arrangement according to application 990329 for fitting a roll shell with bearings without stroke. The figure depicts a stationary roll shaft 1, around which is rotatably mounted a roll shell 2, the external load applied thereto being designated with reference symbol F. The bearing assembly acting in a plane of loading comprises a slide bearing element 3 working against the load, as well as a slide bearing element 4 working in the loading direction. These slide bearing elements 3, 4 of the load bearing assembly are control by a control valve 7, which is supplied with a hydraulic fluid pressure along a feed line 8, the valve 7 distributing the pressure for a cavity 12 of the slide bearing element 3 and along a line 9 for a cavity 13 of the slide bearing element 4. The cavities 12, 13 have pressure measuring/standby lubricating lines 11 and 10, respectively, connected therewith. The operation of such a non-stroke bearing assembly has been described in more detail in the above-mentioned F1 application 990329 and, thus, shall not be explained further in this context. The roll, shell has its lateral bearing system implemented by means of lateral bearing elements 5 and 6 in a per se known manner as described for example in FI patent 98320 and, thus, its operation shall not be described in further detail, either.

Figure 5:
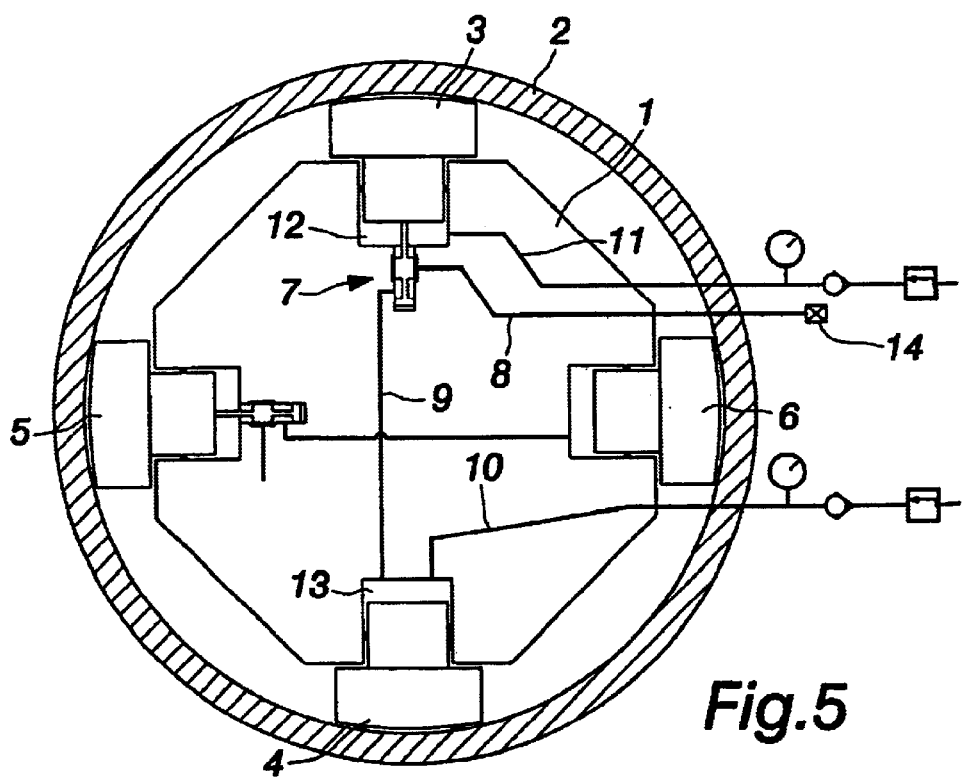
FIG. 5 shows in a schematic view a solution of the invention for supporting a roll shell in a loading direction.

FIG. 5 depicts one preferred embodiment of the invention, wherein the pressure feed line 8 shown in the solution of FIG. 4 is provided with a shut-off valve 14, by means of which the feed pressure control valve 7 can be closed. At this time, the pressure measuring/standby lubricating lines 11, 10 extending to the cavities of the load bearings 3, 4 are actively deployed. Pressure regulating valves are used for supplying the lines with bearing pressures by using a control system similar to what is employed in a normal movable-shell roll. Thus, the control valve 7 functions as a shuttle valve, which isolates the bearing zones to function separately from each other. By means of this solution, the non-stroke bearing assembly of FIG. 4 can be designed as a stroke performing assembly, whereby the roll must naturally be provided with bearing mounting elements and a control valve in such a way that for example a + −20 mm stroke relative to the middle position becomes possible. When the shut-off valve 14 is re-opened and the lines 11, 10 are set in a regular pressure measuring/standby lubricating operation, the roll becomes a non-stroke shell roll, wherein the shell position in radial direction relative to the roll shaft can be selected by means of a piston fitted in the control valve 7 underneath the load bearing 3. The control valve 7 can also be designed to have its position adjustable relative to the roll shaft.

The locking of a movable-shell roll in one extreme position is also conceivably effected by running so much overload on the slide bearing elements on one side of the loading bearing zones that the shell does not commence its stroke in response to a nip load. In this type of function, however, the calendar may be subjected to such a loading condition that the shoes on the opposite side relative to shell holding shoes will be subjected to maximum pressures through a brake valve, the shell being subjected to a major stretching force, which may damage the shell.

What is claimed is:

1. A deflection compensated roll for a paper/board or, finishing machine, comprising a stationary roll shaft (1), and a roll shell (2) structured and arranged to be rotatable around the same and mounted with slide bearing elements (3–6) upon the roll shaft (2), said slide bearing elements being provided with hydraulic fluid feeding means for loading the slide bearing elements with a hydraulic fluid, and said roll being intended to form a nip together with a counter roll, wherein the hydraulic fluid feeding means are provided with control elements, whereby the slide bearing elements (3, 4) acting in the direction of a nip load (F) are loadable in such a way that the roll shell (2) is able to perform a stroke relative to the roll shaft (1) radially of the roll or is able to remain substantially immobilized relative to the roll shaft (1);

wherein the control elements include a control valve (7), which is associated with the loading-direction slide bearing elements (3, 4) and which is connectable to a hydraulic fluid supply pressure by way of a pressure line (8) in such a way that, when the loading (F) is applied to the roll shell, the control valve (7) offsets from the external loading (F) a loading force applied to the loading-direction placed bearing element (3) automatically controlled by a shift of said bearing element instigated by said loading essentially immediately, such that the roll shell bearing assembly is essentially a non-stroke assembly, said pressure line (8) being provided with elements (14) for isolating the pressure line (8) from the feed pressure, and valve means for feeding a hydraulic fluid separately along feed lines (11, 10) to the slide bearing elements (3, 4) located in the loading direction while the pressure line (8) is isolated from the feed pressure, whereby the control valve (7) closes the hydraulic circuits of the slide bearing elements (3, 4) as isolated circuits, thus allowing a stroke of the shell (2) in the loading direction.

2. A roll as set forth in claim 1, wherein the control valve (7) is connected mechanically to the slide bearing element (3) acting in a direction opposite to the loading direction (F), and that the position of the shell (2) relative to the roll shaft (1) is determinable by a positioning of the control valve (7) in its valve box located upon the roll shaft.

3. A roll as set forth in claim 2, wherein the control valve (7) is fitted adjustably in its valve box.

4. A roll as set forth in claim 1, wherein the control elements include valve means, whereby the bearing element (3) acting in a direction opposite to the loading direction (F) is subjectable to such an overload that the shell does not commence its stroke in response to the loading (F).

5. A deflection compensated roll for a paper/board or finishing machine, comprising:

a stationary roll shaft (1);

a roll shell (2) structured and arranged to be rotatable about said stationary roll shaft (1); said stationary roll and said roll shell forming a roll, and wherein said roll in cooperation with a counter roll forms a nip therebetween;

a plurality of slide bearing elements (3–6) structured and arranged on said stationary roll shaft (1), said plurality of slide bearing elements (3–6) being structured and arranged to support said roll shell (2) around said stationary roll shaft (1); and a hydraulic fluid feeding means coupled to each of said plurality of slide bearing elements for loading each of said slide bearing elements with a hydraulic fluid, wherein each of said hydraulic fluid feeding means is provided with control elements, whereby loading-direction slide bearing elements (3, 4) acting in a plane of a nip load (F) are loadable in such a way that said roll shell (2) is able to perform a stroke radially relative to the roll shaft (1) or is able to remain substantially immobilized relative to the roll shaft (1);

wherein the control elements comprise:

a control valve (7) operatively coupled between said loading-direction slide bearing elements (3, 4) and a hydraulic fluid supply pressure via a pressure line (8), wherein said pressure line (8) comprises elements (14) for isolating said pressure line (8) from a feed pressure, and valve means for feeding a hydraulic fluid separately along feed lines (10, 11) to each of said loading-direction slide bearing elements while said pressure line (8) is isolated from said feed pressure, whereby said control valve (7) closes hydraulic lines coupled to said loading-direction slide bearing elements thus allowing a stroke of said shell (2) in said loading direction wherein when said nip load (F) is applied to said roll shell (2), said control valve (7) automatically offsets from said nip load (F) a loading force applied to a loading-direction slide bearing element (3) acting in a direction opposite to said nip load (F), said offset from said nip load (F) being immediately instigated by a shift of said loading-direction slide bearing element acting in a direction opposite to said nip load (F), such that the roll shell bearing assembly is essentially a non-stroke assembly.

6. The deflection compensated roll according to claim 5, wherein said control valve is structured and arranged in a valve box located on said roll shaft (1) and wherein said control valve (7) is mechanically connected to said loading-direction slide bearing element (3) acting in a direction opposite to said nip load (F), whereby the position of said roll shell (2) relative to said roll shaft (1) is determinable by a positioning of the control valve (7) within said valve box.

7. The deflection compensated roll according to claim 6, wherein said control valve (7) is adjustably fitted within said valve box.

8. The deflection compensated roll according to claim 5, wherein the control elements comprise:

valve means, whereby a loading-direction slide bearing element (3) acting in a direction opposite to said nip load (F) is subject to an overload whereby said roll shell does not commence a stroke in response to the loading (F).

* * * * *